US010782884B2

(12) United States Patent
Mayer

(10) Patent No.: US 10,782,884 B2
(45) Date of Patent: Sep. 22, 2020

(54) METHOD AND APPARATUS FOR USE IN ACCESSING A MEMORY

(71) Applicant: Infineon Technologies AG, Neubiberg (DE)

(72) Inventor: Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/588,973

(22) Filed: May 8, 2017

(65) Prior Publication Data
US 2017/0322729 A1 Nov. 9, 2017

(30) Foreign Application Priority Data

May 9, 2016 (DE) .......................... 10 2016 108 525

(51) Int. Cl.
  *G06F 3/06* (2006.01)
  *G06F 12/02* (2006.01)
  *G06F 12/06* (2006.01)

(52) U.S. Cl.
  CPC ............ *G06F 3/061* (2013.01); *G06F 3/0655* (2013.01); *G06F 3/0679* (2013.01); *G06F 12/0246* (2013.01); *G06F 12/0638* (2013.01); *G06F 2212/7201* (2013.01)

(58) Field of Classification Search
  CPC ........... G06F 2212/651; G06F 12/1081; G06F 2212/656; G06F 3/0676; G06F 3/0655; G06F 12/0638; G06F 12/0246; G06F 2212/7201
  See application file for complete search history.

(56) References Cited

U.S. PATENT DOCUMENTS

| 5,526,503 A * | 6/1996 | Kim ...................... G06F 11/261 711/100 |
| 7,243,208 B2 * | 7/2007 | Ito ........................ G06F 12/1027 711/206 |
| 2006/0242383 A1 * | 10/2006 | Chen ................... G06F 12/0638 711/202 |

(Continued)

FOREIGN PATENT DOCUMENTS

| JP | S63245743 A | 10/1988 |
| JP | H04274537 A | 9/1992 |
| JP | 2000163316 A | 6/2000 |

*Primary Examiner* — Reginald G Bragdon
*Assistant Examiner* — Curtis James Kortman
(74) *Attorney, Agent, or Firm* — Eschweiler & Potashnik, LLC

(57) ABSTRACT

A method of determining an access address includes determining a first address translation rule to translate a first input address to a first output address, determining a second address translation rule to translate a second input address to a second output address, and using at least one of the first address translation rule and the second address translation rule to determine the access address. An apparatus for accessing a memory based on a memory address includes a first address translator configured to translate a first input address to a first output address and a second address translator configured to translate a second input address to a second output address. The apparatus is configured to use at least one of the first address translator and the second address translator to translate the memory address to the access address.

17 Claims, 5 Drawing Sheets

(56) References Cited

U.S. PATENT DOCUMENTS

| | | | | |
|---|---|---|---|---|
| 2007/0198804 A1* | 8/2007 | Moyer | ............... | G06F 12/1027 711/202 |
| 2007/0283123 A1* | 12/2007 | Vick | .................. | G06F 12/0284 711/207 |
| 2013/0282999 A1* | 10/2013 | Bennett | .................. | G06F 3/065 711/162 |
| 2014/0173244 A1* | 6/2014 | Thompson | ......... | G06F 12/1027 711/207 |
| 2014/0281130 A1* | 9/2014 | Ellerbrock | ........ | H04L 12/40013 711/103 |
| 2015/0356029 A1* | 12/2015 | Craske | ............... | G06F 12/1441 711/163 |

\* cited by examiner

METHOD AND APPARATUS FOR USE IN ACCESSING A MEMORY

CROSS REFERENCE TO RELATED APPLICATIONS

This application claims priority to German Application number 10 2016 108 525.1, filed on May 9, 2016, the contents of which are incorporated by reference in their entirety.

FIELD

The present disclosure relates to accessing memory, in particular a method of determining an access address for access to the memory. Further the present disclosure relates to an apparatus for accessing a memory.

BACKGROUND

A microcontroller used to control an engine includes an on-chip flash or other nonvolatile memory (NVM). In a certain application, the on-chip flash memory stores constant values that are parameter values for use in a control algorithm implemented in software. These parameter values determine a behaviour of the control algorithm and thus a behaviour of the engine. Calibration means to tune these parameter values, i.e., to adapt values so as to reflect measurements and/or so as to achieve a desired behaviour. This may be performed during operation of the engine. Thus, the calibration can be performed while the microcontroller is operative to control the operation of the engine. While the calibration is performed, a so-called 'overlay' random access memory (RAM) can be used, in order to store the constant values. The overlay RAM can be accessed by translating a memory address for access to the flash memory to an access address for use with the overlay RAM.

Software to be executed by the microcontroller may be outdated. The outdated software may need to be updated. Updated software can be loaded into one half of the flash memory. However, as long as the updated software is not executed, the outdated software is kept in another half of the flash memory for continued execution.

SUMMARY

In one aspect, a method of determining an access address for access to a memory comprises determining a first address translation rule to translate a first input address to a first output address and determining a second address translation rule to translate a second input address to a second output address. Further, the method comprises using at least one of the first address translation rule and the second address translation rule to determine, based on the memory address, the access address.

In one aspect, an apparatus for accessing a memory at an access address comprises a first address translator that is configured to translate a first input address to a first output address and a second address translator that is configured to translate a second input address to a second output address. The apparatus is configured to use at least one of the first address translator and the second address translator to translate the memory address to the access address.

The independent claims define the invention in various aspects. The dependent claims state embodiments according to the invention in the various aspects.

BRIEF DESCRIPTION OF THE DRAWINGS

Objects and features will become apparent from the detailed description with reference to the following figure, wherein.

DETAILED DESCRIPTION

Below, embodiments, implementations and associated effects are disclosed with reference to the accompanying drawing. As used herein, like terms refer to like elements throughout the description.

Figure 1:
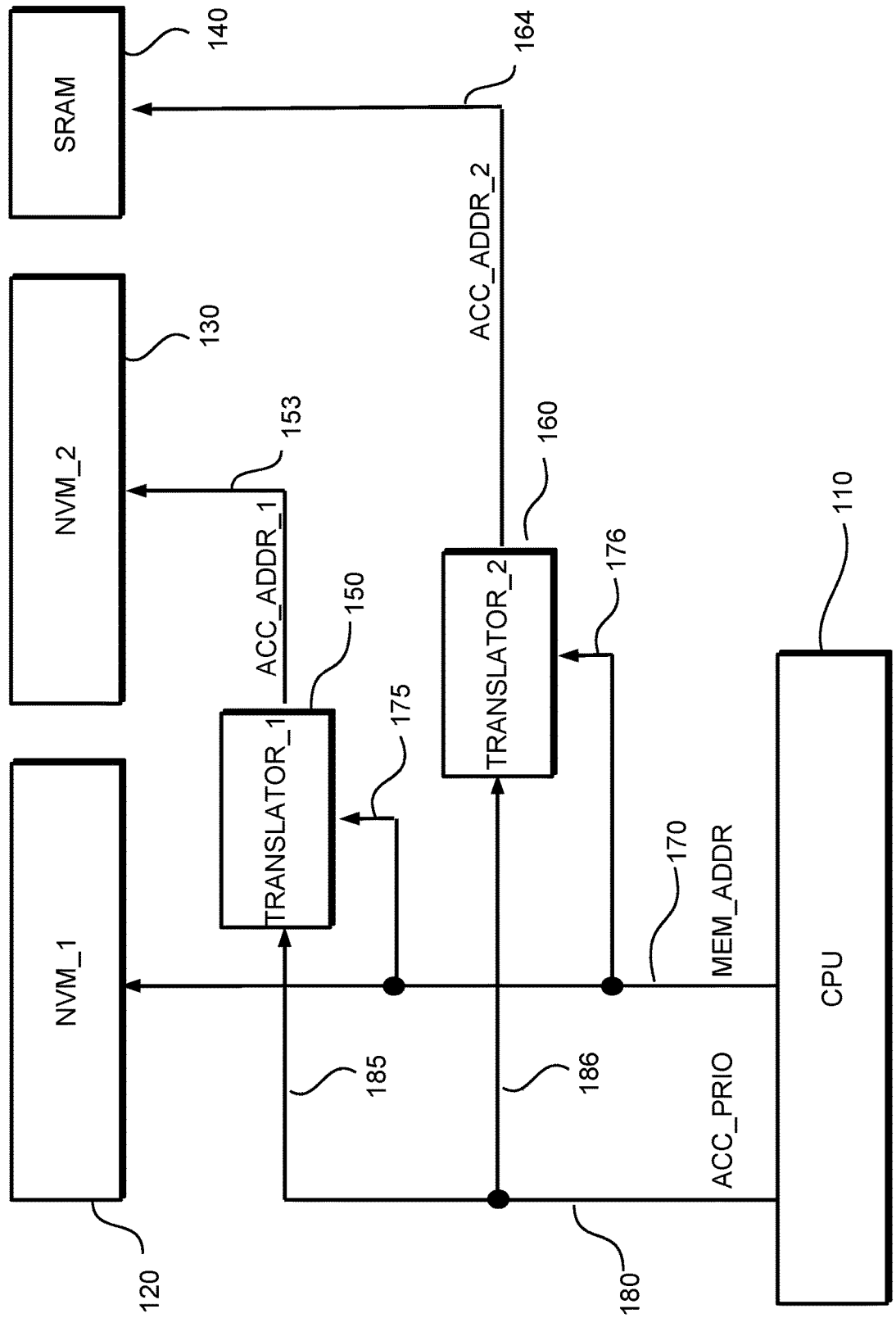
FIG. 1 is a block diagram that schematically illustrates a system according to some embodiments.

FIG. 1 illustrates an exemplary system according to some embodiments.

The system can be implemented as an apparatus and, depending on certain implementation requirements, components of embodiments of the system can be implemented in hardware and/or in software.

The system comprises a processor such as a central processing unit (CPU) 110 and a plurality of memory segments. The memory segments can include various memory or storage technologies. For example, one memory segment, herein referred to as 'operational memory segment 120', is provided as a first non-volatile memory NVM_1. The operational memory segment 120 has an operational address range that can be predetermined. The system can be configured to use the operational memory segment in an ordinary or routine operation of the system.

In addition to the operational memory segment 120, the system further comprises another memory segment, herein referred to as 'first extension memory segment 130', that, in some embodiments, is provided as a second non-volatile memory NVM_2. Further in addition to the operational memory segment 120, the system comprises yet another memory segment, herein referred to as 'second extension memory segment 140', that, in some embodiments, is provided as a volatile memory. The operational memory segment 120, first extension memory segment 130 and/or second extension memory segment 140 are coupled to the CPU 110. For example, the system can comprise an address coupling such as an address bus 170 configured so as to enable the CPU 110 to address the operational memory segment 120, first extension memory segment 130 and/or second extension memory segment 140. It should be understood that the number of memory segments is not limited to three; the system could encompass more memory segments. Further, the wording 'memory segment' should not be understood as limiting. As used herein, the wording 'memory segment' encompasses the meaning of storage, memory, memory portion, memory unit, memory circuit and the like.

The CPU 110 can be configured to access the operational memory segment 120 using a memory access address, herein referred to as 'memory address' MEM_ADDR. The memory address MEM_ADDR can be predetermined to be within the operational address range. In some embodiments, the operational address range is within the boundaries of a range of physical addresses available to address the operational memory segment 120.

In some embodiments, the operational memory segment 120 is provided as a first segment or first portion (first non-volatile memory NVM_1) of a non-volatile memory arrangement coupled to the CPU 110. In some implementations, at least a portion of the non-volatile memory arrangement is integrated with other circuitry including the CPU 110. The non-volatile memory arrangement can, for example, include a flash memory, ferroelectric random access memory, phase-change random access memory, millipede memory and/or magneto-resistive memory.

In some embodiments, the first extension memory segment 130 (second non-volatile memory NVM_2) is provided as a second segment or second portion of the non-volatile memory arrangement. In some embodiments, the operational memory segment 120 (first non-volatile memory NVM_1) and the first extension memory segment 130 (second non-volatile memory NVM_2) form part of a single flash memory unit. In some embodiments the single flash memory unit is embedded with the CPU 110.

The first extension memory segment 130 has a first extension address range (herein also briefly referred to as first address range) that differs from the operational address range. In some implementations, the operational address range and the first extension address range do not overlap, i.e., the operational address range and the first extension address range do not have any address in common.

In some embodiments, the first extension address range encompasses as many addresses as the operational address range. At least one effect can be that the first extension memory segment 130 (second non-volatile memory) can be used as a so-called 'overlay' random access memory (RAM). The overlay RAM can be configured to store a set of calibration parameter values that each corresponds to one in a corresponding set of calibration parameter values stored in the operational memory segment 120 (first non-volatile memory). As will be described below, such an embodiment can be used in calibration of parameter values during operation of the system. Also, in some embodiments, the overlay RAM can be configured to store a software code configured for execution by the CPU. In particular, the software code can be a copy or an update version of software stored in the operational memory segment.

In some embodiments, the second extension memory segment 140 is provided as a volatile memory coupled to the CPU 110. The volatile memory can be provided, for example, as a dynamic random access memory (DRAM) or as a static random access memory (SRAM). The second extension memory segment 140 (volatile memory) can be embedded in a circuit that includes the CPU 110. The second extension memory segment 140 can also be implemented as a circuit block that is separate from the CPU 110. At least one effect can be that access to the volatile memory can be fast in comparison with access to the non-volatile memory.

In some embodiments, the second extension memory segment 140 can have a second extension address range (herein also briefly referred to as second address range) that differs from both, the operational address range and the first extension address range. For example, the second extension address range can differ such that the second extension address range does not share any address with the operational address range or with the first extension address range. Thus, in some embodiments, the second extension address range does not overlap with any other address range. At least one effect can be that the system can be configured to use the second extension memory segment, in particular where provided as a volatile RAM, when performing activities such as calibration that require numerous read-write cycles. Thus, an early deterioration of flash memory can be avoided. In some embodiments, the second extension address range encompasses fewer addresses than the first extension address range. At least one effect can be that the second extension memory segment can require less chip area and, in operation, e.g., when performing a read access or when performing a write access, may consume less power than the first extension memory segment.

The exemplary system illustrated in FIG. 1 further comprises a plurality of address mapping blocks, herein also briefly referred to as 'address translators', that are configured to map the memory address MEM_ADDR to a mapped address, herein also referred to as an 'access address'. At least one effect can be that the memory address MEM_ADDR can be used to access memory other than the operational memory segment, if the translator translates the memory address MEM_ADDR to the access address within the first extension address range or within the second extension address range.

In the example illustrated in FIG. 1, the system comprises a first address translator 150. The first address translator 150 forms part of the coupling of the CPU 110 to the first extension memory segment 130. The first address translator 150 is configured to translate the memory address MEM_ADDR to the access address ACC_ADDR_1. In some embodiments, the first address translator 150 is configured to use a first translation rule in order to translate the memory address MEM_ADDR. In some embodiments, the first address translator 150 is associated with a first level of priority that, in some implementations, is predetermined while, in other embodiments, the level of priority associated with the first address translator 150 can be subject to variation. In some embodiments, the first address translator is configured to translate the memory address MEM_ADDR only if a level of priority associated with the memory access is consistent with the first level of priority associated with the first address translator 150.

Further, the system can comprise a second address translator 160. The second address translator 160 forms part of the coupling of the CPU 110 to the second extension memory segment 140. The second address translator 160 is configured to translate the memory address MEM_ADDR to the access address ACC_ADDR_2. In some embodiments, the second address translator 160 is configured to use a second translation rule in order to translate the memory address MEM_ADDR, wherein the second translation rule differs from the first translation rule. In some embodiments, the second address translator 160 is associated with a second level of priority that differs from the first level of priority. In some embodiments, the fact that second address translator 160 is associated with the second level of priority is predetermined. In other embodiments, the level of priority associated with the second address translator 160 can be varied. In some embodiments, the second address translator 160 is configured to translate the memory address MEM_ADDR only if the level of priority associated with the memory access is consistent with the second level of priority associated with the second address translator 160.

The system can comprise a control coupling such as a control bus 180 configured to transmit a control signal, via a first control connection 185, to the first address translator 150 and/or, via a second control connection 186, to the second address translator 160.

In some embodiments, a coupling of the first address translator 150 to the CPU 110 is provided. The coupling can be configured to transmit the memory address MEM_ADDR for access to memory from the CPU 110 to the first address translator 150. For example, the coupling can be provided by a first-translator address connection 175 to the address bus 170. The first address translator 150 can be coupled to the first extension memory segment 130 by a first extension access connection 153 that is configured to enable the CPU 110 to access the first extension memory segment 130 via the first address translator 150. Further, the coupling between CPU 110 and the first address translator 150 can include a first-translator control connection 185 to the control bus 180, wherein the first-translator control connection 185 is configured to provide a control signal from the CPU 110 to the first address translator 150. As will be discussed in more detail below, the control signal can include an access priority signal ACC_PRIO that is representative of a priority level associated with an access and/or memory address MEM_ADDR.

Likewise, in some embodiments, a coupling of the second address translator 160 to the CPU 110 is provided. The coupling can be configured to transmit the memory address MEM_ADDR for access to memory from the CPU 110 to the second address translator 160. For example, the coupling can be provided by a second-translator address connection 176 to the address bus 170. The second address translator 160 can be coupled to the second extension memory segment 140 by a second extension access connection 164 that is configured to enable the CPU 110 to access the second extension memory segment 140 via the second address translator 160. Further, the coupling of the CPU 110 to the second address translator 160 can include a second-translator control connection 186 to the control bus 180, wherein the second-translator control connection 186 is configured to provide a control signal from the CPU 110 to the second address translator 160.

In some embodiments, the CPU 110 is configured to generate, based on access information such as kind of access (read access/write access), subject of access (fetch of an instruction, read of a parameter value), mode of operation (routine operation, operation during a calibration) etc. an access priority signal ACC_PRIO. The CPU can be configured to output the access priority signal ACC_PRIO to the control bus 180 for transmission to at least one of the first address translator 150 and the second address translator 160.

Exemplary implementations of operating the system according to some embodiments, for example, as described above, will now be described.

In one exemplary implementation, the system is used in control of an engine, for example, in an automotive environment. For example, the CPU 110 can be configured to control the engine and/or a powertrain in an automobile. In some implementations, the CPU 110 is configured to execute software stored in the operational memory segment 120 by reference to an address within the operational address range. Execution of the software can include a reference to parameter variables whose values can differ from one use situation to another. For example, a value of a given parameter variable may, for example, decrease over time, increase, or otherwise vary according to circumstances. While some parameter values require frequent measurement and update, others, for the purpose of operation, can be regarded as constant. However, even constant parameters require a first determination, referred to as calibration, and constant parameters may also require, from time to time, a re-calibration. In some implementations, once the constant value of a parameter variable is determined, it is stored, for example, as an integral portion of the software, together with the software in the operational memory segment 120.

In some implementations, calibration of the constant parameter variable's value is performed. As used in this example, 'calibration' encompasses the meaning of 're-calibration'. In order to perform the calibration, software stored in the operational memory segment is copied to the first extension memory segment 130. While the calibration is performed, the first address translator 150 is used in order to direct all or a part of the memory accesses to the first extension memory segment 130.

In some implementations, while calibration of the constant parameter variable's value is performed, values of a parameter that is subject to calibration are stored in the second extension memory segment 140. Therefore, while the calibration is performed, the second address translator 160 is used in order to direct the memory access to the second extension memory segment 140. At least one effect can be that, if during the calibration a parameter variable should need to be updated, for example as a result of a measurement performed during the calibration, then an updated value of the parameter variable can be written to the second extension memory segment 140. If need be or otherwise desired, access to the second extension memory segment 140 can also be performed in order to read an updated value from the second extension memory segment 140, for example, to control the engine during the calibration on the basis of the updated value.

As described above, the first address translator 150 uses the first translation rule in order to translate the memory address MEM_ADDR to the access address ACC_ADDR_1. Likewise, the second address translator 160 uses the second translation rule in order to translate the memory address MEM_ADDR to the access address ACC_ADDR_2.

Depending on the first translation rule and on the second translation rule, some memory addresses MEM_ADDR can be associated with two access addresses that differ from one another. For example, a memory address MEM_ADDR of a location where a parameter value is written in the operational memory segment 120, according to the first translation rule, is translated by the first address translator 150 to a first access address of a location in the first extension memory segment 130 where the parameter value is stored as a part of the copy of the software. The same memory address MEM_ADDR can further be translated by the second address translator 160 to a second access address of a location in the second extension memory segment 140 where the updated parameter value is stored.

In some implementations, the first address translator 150 and the second address translator 160 can use the access priority signal ACC_PRIO provided by the CPU 110 in order to decide which access address to use in the memory access. For example, if the second address translator 160 is associated with the highest level of priority while the first address translator 150 is associated with a lower level of priority, and if an access is associated with the highest level of priority, then the access can be performed using only the second address translator 160, whereby the access is performed at the access address ACC_ADDR_2 in the second extension memory segment 140.

The above-described priority based access can be used as described in an example where an association of a level of priority with an access operation such as reading or writing and with the kind of access operation argument such as variable value or instruction code. For example, a read access for reading a line of instruction code from memory can be associated with a lowest level of priority, while a read access for reading a value of a variable can be associated with a higher level of priority.

At least one effect can be that access in order to read and/or write parameter variable values can be directed to the second extension memory segment 140, i.e., the volatile memory, while other accesses are directed to the first extension memory segment 130, i.e., the non-volatile memory. In particular, the effect can be used during an exceptional operation such as during calibration that differs from a routine operation that merely requires the CPU 110 to access the operational memory 120. Accordingly, in some implementations, if there is no calibration, for example, if the calibration is completed, the CPU 110 can output the access priority signal ACC_PRIO so as to represent a lowest level of priority. If neither the first address translator 150 nor the second address translator 160 is associated with the lowest level of priority, the memory address MEM_ADDR can be used to access memory in the operational memory segment 120.

The implementations herein are described in terms of exemplary embodiments. However, it should be appreciated that individual aspects of the implementations may be separately claimed and one or more of the features of the various embodiments may be combined.

Generally, in one aspect an apparatus for accessing a memory based on a memory address comprises a first address translator configured to translate the memory address to the access address and a second address translator that is configured to translate the memory address to the access address. The apparatus is configured to use, based on the memory address, at least one of the first address translator and the second address translator. In some embodiments the memory comprises an operational memory segment associated with an operational address range and a first extension memory segment associated with a first extension address range and a second extension memory segment associated with a second extension address range. Each one of first extension address range and second extension address range is associated with a different one of at least a first address translation rule and a second address translation rule. An exemplary method of using the memory comprises, during an operational phase, using a memory address to access the operational memory segment associated with the operational address range. Further, during a parameter value setting or calibration phase, selecting a selected one of the first translation rule and the second translation rule, and translating the memory address to an access address within the first extension address range or within the second extension address range. In some implementations, the method comprises using the access address to access an extension memory segment associated with the selected one of first extension address range and second extension address range. The selecting can be performed such that, if the memory address can be subject to both, the first translation rule and the second translation rule, then a first priority level associated with the selected one of first translation rule or the first extension address range and a second priority level associated with the second translation rule or the second extension address range can be used to determine which of the first translation rule and the second translation rule is performed. In one embodiment, the translation rule that is associated with the highest priority is used. In some implementations, the translation rule is used whose associated priority matches the access priority level.

In some embodiments, the first priority level is predetermined to be statically associated with the first translation rule. Likewise, the second priority level can be predetermined to be statically associated with the second translation rule.

Generally, in another aspect, a parameter value acquisition method for use with a processor configured to access a memory coupled to the processor comprises an operational memory segment associated with an operational address range. The memory further comprises a first extension memory segment associated with a first address range. The first address range is associated with one of at least two priority levels. The memory further comprises a second extension memory segment associated with a second address range. The second address range is associated with another one of the at least two priority levels. The method comprises, during an operational phase, using an operational address to read parameter values from the operational memory segment associated with the operational address space. The method further comprises, during a parameter value setting or calibration phase, selecting a selected one of a first translation rule for translation of the memory address to an access address in the first address range and a second translation rule for translation of the memory address to an access address in the second address range. The method comprises translating the memory address to an access address within the selected one of first address range and second address range. In some embodiments, the method comprises using the access address to access the first extension memory segment or the second extension memory segment, for example, depending on which of the first extension memory segment and the second extension memory segment is associated with the selected one of the first address range and the second address range.

In some embodiments, the selecting of the selected one of first address range and second address range is based on a priority level associated with the selected one of first address range and second address range matches the access priority level. The priority level can be statically associated with an address translator used to perform the translation of the memory address. In some embodiments, the priority level can be predetermined. In some embodiments, an access priority level for parameter value write access is high and for parameter value read access is low. In some embodiments, an access priority level for access to instruction code is low while an access priority level for parameter value access is high.

Figure 2:
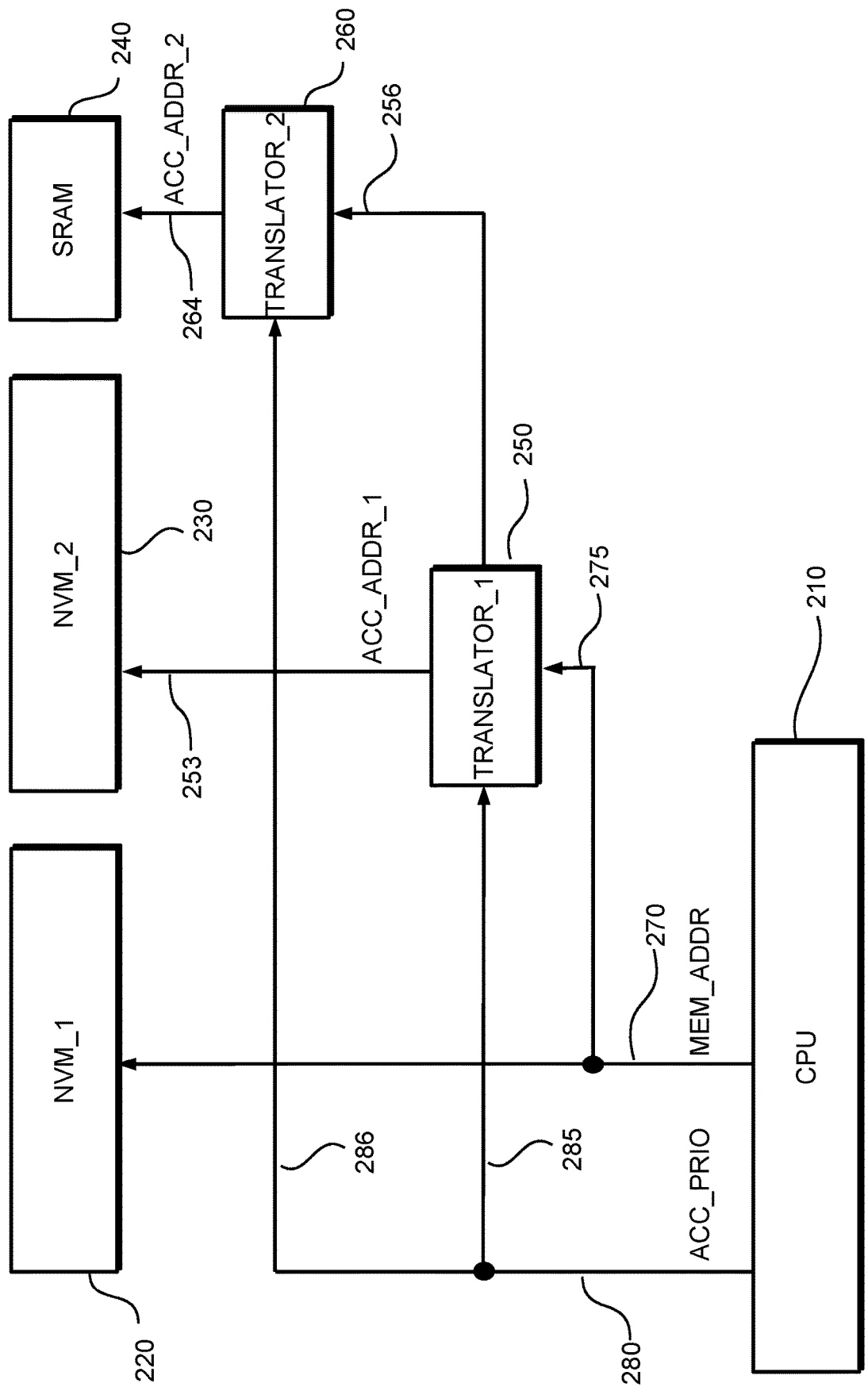
FIG. 2 is a block diagram that schematically illustrates a system according to some embodiments.

FIG. 2 is a block diagram that schematically illustrates a system according to some embodiments. The system illustrated in FIG. 2 is similar to the system in FIG. 1. Like elements have like reference numerals (second and third digits) throughout and need not be explained again.

Some differences will now be explained. As explained above, in the system in FIG. 1 the address bus 170 is coupled to the first address translator 150 via the first-translator address connection 175, and the first address translator 150 is coupled to the first extension memory segment 130 via the first extension access connection 153. Further, the address bus 170 is coupled to the second address translator 160 via the second-translator address connection 176, and the second address translator 160 is coupled to the second extension memory segment 140 via the second extension access connection 164. At least one effect can be that, in operation of the system in FIG. 1, the second address translator 160 receives, via the address bus 170, the memory address MEM_ADDR from the CPU 110. The system in FIG. 2 differs from the system in FIG. 1 in that, instead of the second address translator 260 being directly coupled to the address bus 270, the second address translator 260 is merely coupled, via a second-translator address line 256, to the second address translator 260.

At least one effect can be that, in operation of the system in FIG. 2, the second address translator 260 receives a translated address from the first address translator 250. One effect can be that, unless the first address translator 250 translates the memory address MEM_ADDR identically to the first access address ACC_ADDR_1, i.e., ACC_ADDR_1=MEM_ADDR, the second address translator 260 does not translate the memory address MEM_ADDR.

Figure 3:
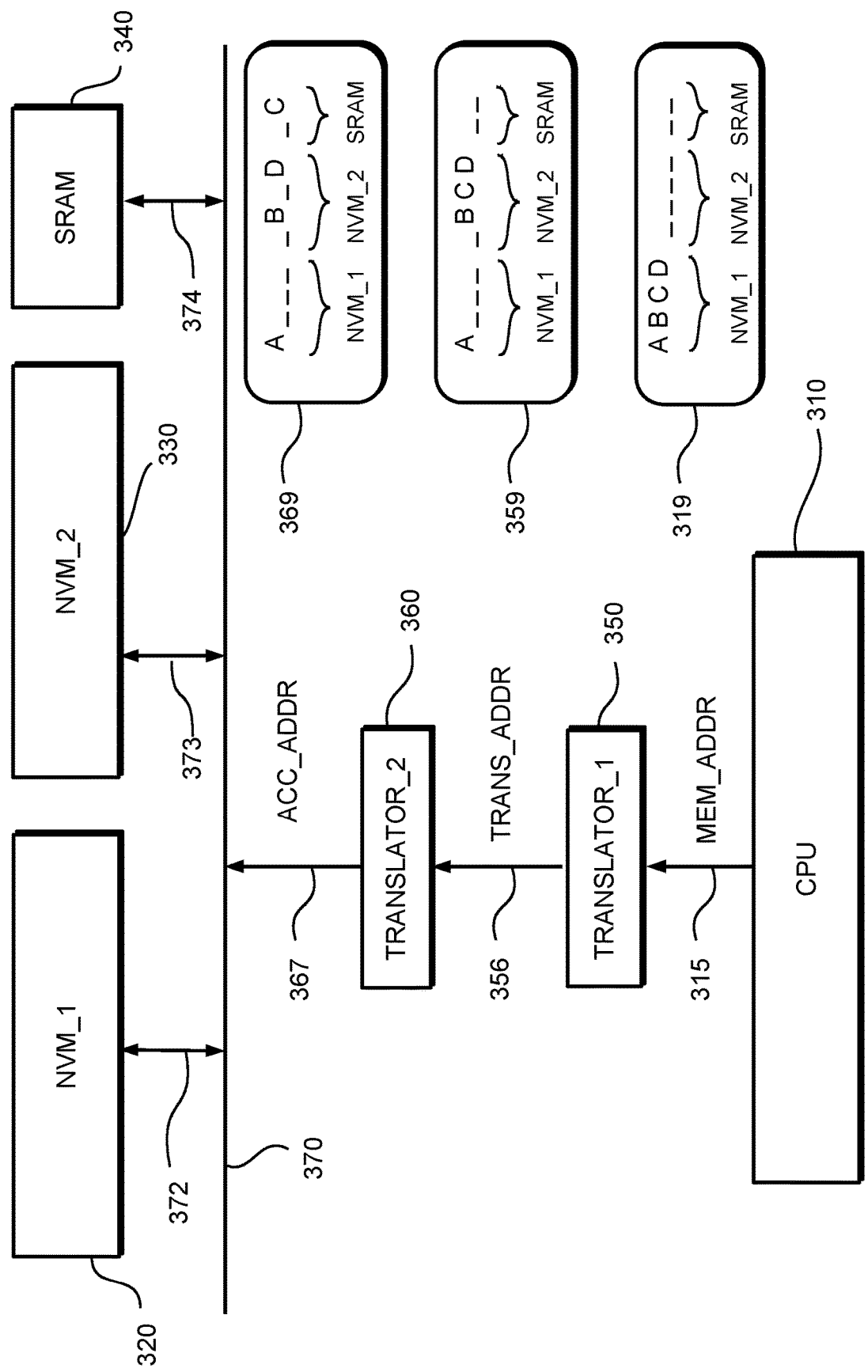
FIG. 3 is a block diagram that schematically illustrates a system according to some embodiments.

FIG. 3 is a block diagram that schematically illustrates a system according to some embodiments. The system illustrated in FIG. 3 is similar to the system in FIG. 1. Like elements have like reference numerals (second and third digits) throughout and need not be explained again.

Some differences will now be explained. As explained above, in the system in FIG. 1 the address bus 170 is coupled to the CPU 110. At least one effect can be that the CPU provides the memory address MEM_ADDR to the address bus 170, either for use in direct access to the operational memory segment 120, or for translation by first address translator 150 and use in access to the first extension memory segment 130, or for translation by the second address translator 160 and use in access to the second extension memory segment 140. The system in FIG. 3 differs from the system in FIG. 1 in that, instead of the CPU 110 being directly coupled to the address bus 170, the CPU 310 is coupled, via the first-translator address line 315, to the first address translator 350. In turn, the first address translator 350 is coupled, via a second-translator address line 356, to the second address translator 360. Only the second address translator 360 is coupled, via a bus address line 367, to the address bus 370. The address bus 370 is directly coupled, via an operational access line 372, to the operational memory 320. The address bus 370 is directly coupled, via a first-segment access line 373, to the first extension memory segment 330. The address bus 370 is directly coupled, via a second-segment access line 374, to the second extension memory segment 340.

At least one effect can be that, in operation of the system in FIG. 3, the second address translator 360 receives a translated address from the first address translator 350 and the address bus 370 receives the access address from the second address translator 360. Thus, in some implementations, the first address translation rule and the second address translation rule can be used sequentially. Another effect can be that, unless the first address translator 350 translates the memory address MEM_ADDR identically to the translated address TRANS_ADDR, i.e., TRANS_ADDR=MEM_ADDR and the second address translator 360 translates the translated address TRANS_ADDR identically to the access address ACC_ADDR, i.e., ACC_ADDR=TRANS_ADDR, the address bus 370 does neither receive the memory address MEM_ADDR from the CPU 310 nor the translated address TRANS_ADDR from the first address translator 350. Such an implementation avoids a need to select one in a plurality of potential access addresses for use in access to memory.

In operation, for example, an address space may encompass, as shown at reference numeral 319, ten memory cells at corresponding ten addresses: four addresses to access the operational memory segment 320, four addresses to access the first extension memory segment 330, and two addresses to access the second extension memory segment 340. In the example, values D, C, B, A are to be written at the four addresses used to access the operational memory segment 320. As shown at the reference numeral 359, according to a first exemplary translation rule, the first address translator 350 translates the addresses associated with the values D, C and B to translated addresses in the address space of the first extension memory segment 330, whereas other addresses are not translated. As shown at the reference numeral 369, according to a second exemplary translation rule, the second address translator 360 translates the address associated with the value C to the access address in the address space of the second extension memory segment 340, whereas other addresses are not translated.

Figure 4:
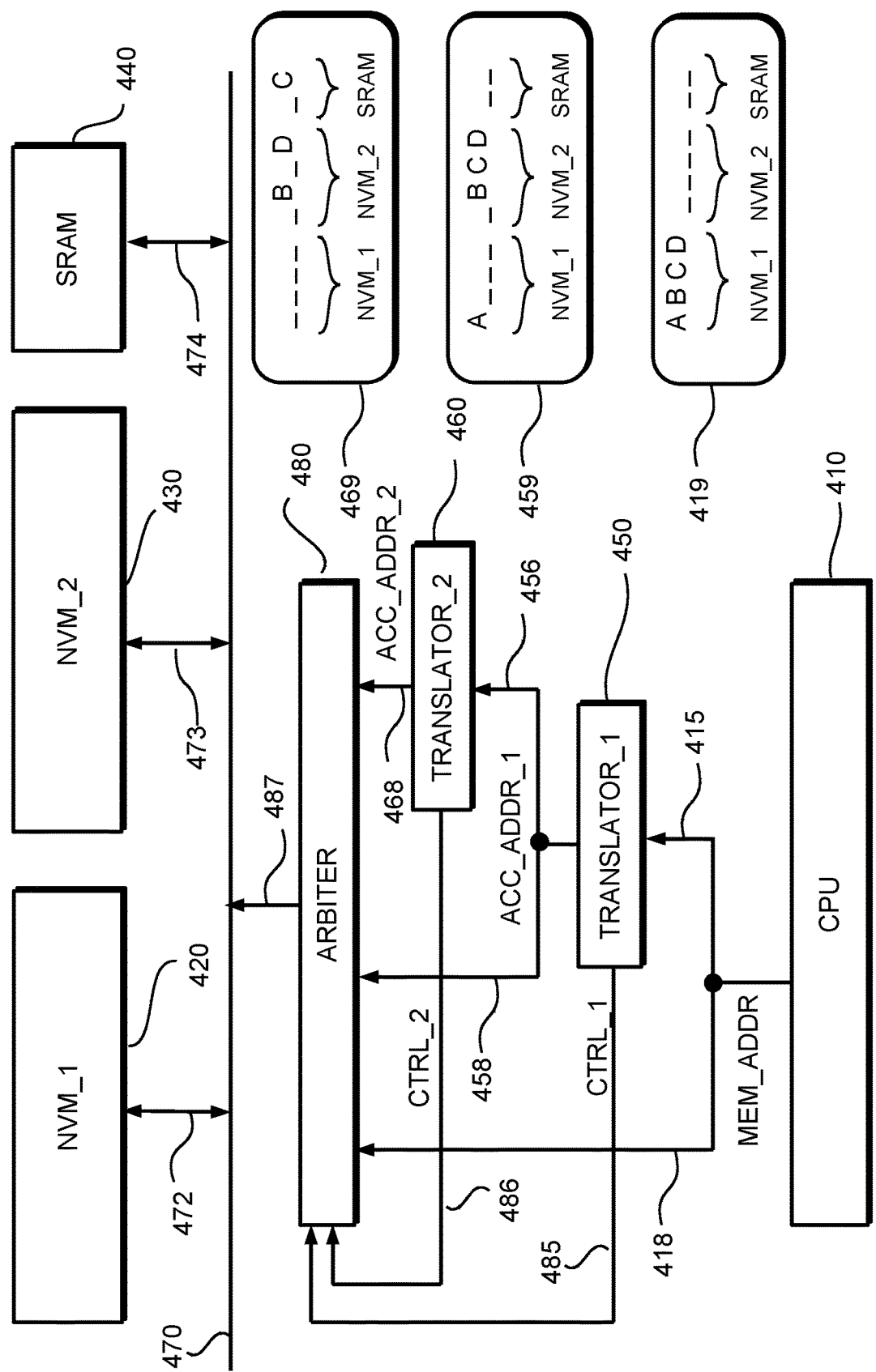
FIG. 4 is a block diagram that schematically illustrates a system according to some embodiments.

FIG. 4 is a block diagram that schematically illustrates a system according to some embodiments. The system illustrated in FIG. 4 is similar to the system in FIG. 3. Like elements have like reference numerals (second and third digits) throughout and need not be explained again.

Some differences will now be explained. As explained above, in the system in FIG. 3 the CPU 310 is only indirectly coupled to the address bus 370 via the first address translator 350 and the second address translator 360.

The system in FIG. 4 differs from the system in FIG. 3 in that the system comprises an arbiter unit 480. Thus, in some implementations, the first address translation rule and the second address translation rule can be applied in parallel. The CPU 410 can be coupled to the first address translator 450, and also, via a CPU address connection 418 to the arbiter unit 480. Further, the first address translator 450 can be coupled to the second address translator 460, and also, via a first-translator address connection 458, to the arbiter unit 480. At least one effect can be that the first address translator 450 can output the translated address as a first access address ACC_ADDR_1 to the arbiter unit 480 as well as to the second address translator 460 for further translation of the translated address to a second access address ACC_ADDR_2 to be output to the arbiter unit 480.

In some embodiments, the arbiter unit 480 is coupled to the address bus 470. In some embodiments, the arbiter unit 480 is configured to determine which of the memory address MEM_ADDR, the first access address ACC_ADDR_1 and the second access address ACC_ADDR_2 to be output to the address bus 470 for use in access to memory. The address bus 470 is coupled, via an operational access connection 472, to the operational memory segment 420. The address bus 470 can further be coupled, via a first-segment access connection 473, to the first extension memory segment 430. The address bus 470 can also be coupled, via a second-segment access connection 474, to the second extension memory segment 440.

Unlike the system in FIG. 3, where the address bus 370 is directly coupled to the second address translator 360, in the system illustrated in FIG. 4, the second address translator 460 is coupled, via a second-translator bus connection 468, to the arbiter unit 480. At least one effect can be that the arbiter unit 480 can be configured to determine which address to use for the access to memory: the memory address MEM_ADDR, the first access address ACC_ADDR_1, or the second access address ACC_ADDR_2. In some implementations, the arbiter unit 480 is coupled, via a first control connection 485, to the first address translator 450. At least one effect can be that the arbiter unit 480 can be configured to receive a first control signal CTRL_1 that indicates activity of the first address translator 450.

Similarly, the arbiter unit 480 is coupled, via a second control connection 486, to the second address translator 460. At least one effect can be that the arbiter unit 480 can be configured to receive a second control signal CTRL_2 that indicates activity of the second address translator 460. Thus, the arbiter unit 480 can base a selection of one of the memory address MEM_ADDR, the first access address ACC_ADDR_1 and the second access address ACC_ADDR_2 for use in access to memory on the first control signal CTRL_1 and/or on the second control signal CTRL_2. In some implementations, for example, the arbiter unit 480 can determine the second access address ACC_ADDR_2 to be used in access to memory, whenever the second control signal CTRL_2 indicates that the second address translator 460 translated the first access address ACC_ADDR_1 to the second access address ACC_ADDR_2.

Some implementations do without the first control connection and/or the second control connection. In such implementations, the arbiter unit 480 can be configured to detect presence of the first access address ACC_ADDR_1 and/or the second access address ACC_ADDR_2. For example, the arbiter unit can be configured to use the second access address ACC_ADDR_2 in access to memory, whenever the arbiter unit 480 detects presence of the second access address ACC_ADDR_2. Thus, the arbiter unit 480 can give highest priority to access at the second access address ACC_ADDR_2.

In operation, as in the example used for illustrative purposes in the discussion of FIG. 3, the address space may encompass, as shown at reference numeral 419, ten memory cells at corresponding ten addresses: four addresses to access the operational memory segment 420, four addresses to access the first extension memory segment 430, and two addresses to access the second extension memory segment 440. In the example, values D, C, B, A are to be written at the four addresses used to access the operational memory segment 420. As shown at the reference numeral 459, according to a first exemplary translation rule, the first address translator 450 translates the addresses in the address space of the operational memory segment 420 that are associated with the values D, C and B to translated addresses in the address space of the first extension memory segment 430, whereas other addresses in the address space are of the operational memory segment 420 not translated. As shown at the reference numeral 469, according to a second exemplary translation rule, the second address translator 460 translates the address in the address space of the first extension memory segment 430 that is associated with the value C to the access address in the address space of the second extension memory segment 440, whereas other addresses in the address space of the first extension memory segment 430 are not translated.

Figure 5:
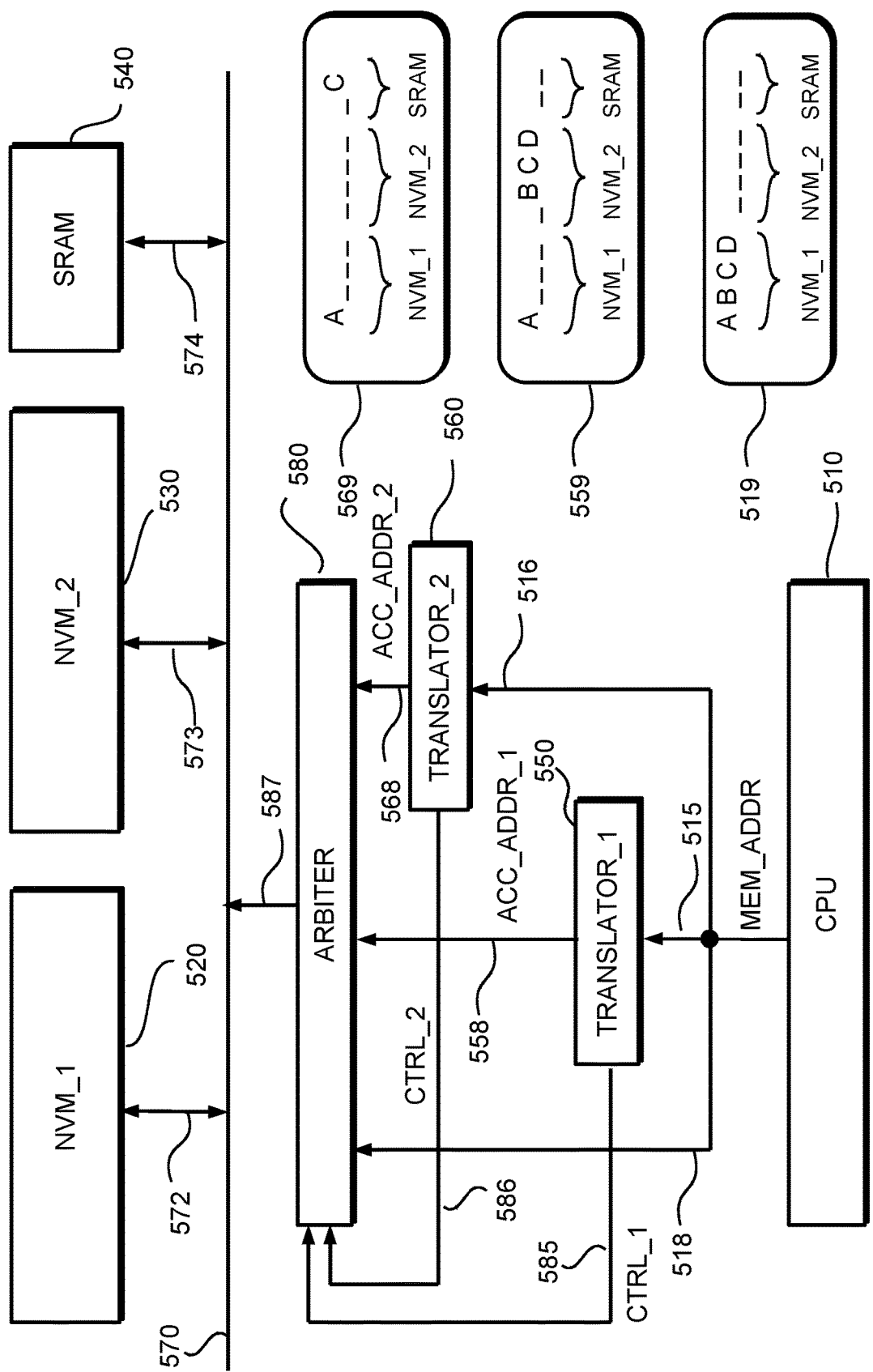
FIG. 5 is a block diagram that schematically illustrates a system according to some embodiments.

FIG. 5 is a block diagram that schematically illustrates a system according to some embodiments. The system illustrated in FIG. 5 is similar to the system in FIG. 4. Like elements have like reference numerals (second and third digits) throughout and need not be explained again.

Some differences will now be explained. As explained above, the system in FIG. 4 includes the arbiter unit 480 that can be configured to determine one of the memory address MEM_ADDR, the first access address ACC_ADDR_1 and the second access address ACC_ADDR_2 to be output to the address bus 470 for use in access to memory. The CPU 410 is only indirectly coupled to the address bus 470 via the first address translator 450 and the second address translator 460.

The system in FIG. 5 differs from the system in FIG. 4 in that the second address translator 560 is directly coupled, via a second-translator address connection 516 to the CPU 510. At least one effect can be that the second address translator 560 can be configured to translate the memory address MEM_ADDR to the second access address ACC_ADDR_2. Such an implementation can be particularly efficient.

In operation of the exemplary system illustrated in FIG. 5, as in the example used for illustrative purposes in the discussion of FIGS. 3 and 4, the address space may encompass, as shown at reference numeral 519, ten memory cells at corresponding ten addresses: four addresses to access the operational memory segment 520, four addresses to access the first extension memory segment 530, and two addresses to access the second extension memory segment 540. In the example, values D, C, B, A are to be written at the four addresses used to access the operational memory segment 520. As shown at the reference numeral 559, according to a first exemplary translation rule, the first address translator 550 translates the addresses in the address space of the operational memory segment 520 that are associated with the values C and B to translated addresses in the address space of the first extension memory segment 530, whereas other addresses in the address space of the operational memory segment 520 are not translated. As shown at the reference numeral 569, according to a second exemplary translation rule, the second address translator 560 translates the address in the address space of the operational memory segment 520 that is associated with the value B to the access address in the address space of the second extension memory segment 540, whereas other addresses in the address space of the operational memory segment 520 are not translated.

Use of the apparatus and/or method disclosed herein can have an effect whereby access to an address range in the first memory segment can be redirected, for example, from the first memory segment to the second memory segment. The redirection can be performed selectively, i.e, the first address range can be smaller than a full address range of the first memory segment. Thus, the second memory segment can be smaller than the first memory segment. In one implementation, for example, access to a first memory section predetermined, for storing constants in the second memory segment, can be redirected to the second memory segment. Further, access to one or more selected subranges in the first address range, predetermined for storing selected constants in the second memory segment, can be redirected to the third memory segment. Thus, a subset of the selected constants in can be accessed the third memory segment. In some embodiments, the third memory segment need not be larger than required to store the subset of the selected constants.

In a solution, where the translation of addresses is performed without using two levels of priority, in an example corresponding to the examples illustrated in FIGS. 3 to 5, one address translator is needed to translate the address for access to value B, one address translator is needed to translate the address for access to value C, and one address translator is needed to translate the address for access to value D, i.e., altogether three address translators are needed. In contrast, in embodiments where, in accordance with the concepts underlying the present disclosure, a first address range is translated en bloc to a translated address range, and where a selected subrange in the translated address range is translated to a corresponding output address range, a number of address translators required to perform the address translation can be smaller. In the illustrated example, in order to access memory where values A, B, C, D are stored, one address comparator is needed to translate, collectively, the memory address range where values B, C and D are stored. Next, for access to the memory where the value C is stored, one address comparator is needed to translate the translated address range, i.e., in sum only two address translators are needed.

While the concepts underlying the present disclosure have been illustrated using examples with two address translators, it should be understood that more address translators than two could be used. Using the present disclosure, the person skilled in the art can implement embodiments that include more address translators provided in sequence, for example, as a variant of one of the embodiments illustrated in FIGS. 2 and 3, or in parallel, for example, as a variant of one of the embodiments illustrated in FIGS. 1 and 5, or in a combination of both, for example as a variant of the embodiment illustrated in FIG. 4.

As used herein, the wording 'address range' does not necessarily require the address range to be a set of contiguous addresses. In some implementations, one address range could encompass a plurality of address sub-ranges that are detached or separate from one another and thus non-contiguous.

Generally, implementations of methods described herein can be implemented as a computer program product with a program code, the program code being operative for performing one of the methods when the computer program product runs on a processor. The program code may for example be stored on a machine readable carrier. One embodiment includes an apparatus or a system configured to transfer (for example, electronically or optically) a computer program for performing one of the methods described herein to a receiver. The receiver may, for example, be a computer, a mobile device, a memory device or the like, for example a microcontroller and/or memory in an automotive environment. The apparatus or system may, for example, include a file server at a fixed location for transferring the computer program to the receiver in an automobile.

In some embodiments a programmable logic device (for example a field programmable gate array) may be used to perform some or all of the functionalities of the methods described herein. In some embodiments, a field programmable gate array may cooperate with a microprocessor in order to perform one of the methods described herein. For example, the first address translator and/or the second address translator can be implemented as a logic circuit. Generally, the methods can be performed by any hardware apparatus.

Exemplary implementations/embodiments discussed herein may have various components collocated; however, it should be appreciated that the components of the arrangements may be combined into one or more apparatuses.

As used herein, the articles 'a' and 'an' should generally be construed to mean 'one or more,' unless specified otherwise or clear from context to be directed to a singular form.

As used herein, the wording 'A coupled to B' means a capacity of A to provide C to B, provided that B is ready to accept C, wherein C, as the case may be, is a signal, power, message or other abstract or concrete thing as described in the context of the wording.

As used herein, the terms 'coupled' and 'connected' may have been used to describe how various elements interface. Unless expressly stated or at least implied otherwise, such described interfacing of various elements may be either direct or indirect.

As used herein, the terms 'having', 'containing', 'including', 'with' or variants thereof, and like terms are open ended terms intended to be inclusive. These terms indicate the presence of stated elements or features, but do not preclude additional elements or features.

As used herein, terms such as 'first', 'second', and the like, are also used to describe various elements, regions, sections, etc. and are also not intended to be limiting.

The invention claimed is:

1. A method of determining an access address for an access to a memory based on a memory address, the method comprising:
  selectively using either a first translation circuit having a first address translation rule, a second translation circuit having a second address translation rule, or neither the first translation circuit nor the second translation circuit to translate the memory address to the access address,
  wherein the first translation circuit having the first address translation rule is associated with a first priority level,
  wherein the second translation circuit having the second address translation rule is associated with a second priority level that differs from the first priority level,
  wherein selectively using either the first translation circuit or the second translation circuit is determined by an access priority signal dictating the first priority level or the second priority level, and
  wherein if the access priority signal indicates a priority level other than the first priority level or the second priority level, the access address is equal to the memory address to access an operational address range in the memory, and the first translation circuit and the second translation circuit are not used to translate the memory address to any address.

2. The method of claim 1,
  wherein the first address translation rule defines a first output address to be within a first output address range and the second address translation rule defines a second output address to be within a second output address range, and wherein the second output address range, the first output address range, and the operational address range each differ from one another by at least one address.

3. The method of claim 1, further comprising:
  predetermining a direct address access rule that defines the access address to be the memory address,
  performing an operation in a mode of operation,
  wherein the operation includes the access to the memory, and
  wherein selecting use of the direct address access rule is based on the mode of operation.

4. The method of claim 1,
  wherein the first priority level is predetermined, and
  wherein the second priority level is predetermined.

5. An apparatus for an access to a memory, based on a memory address, at an access address, the apparatus comprising:
  a first address translator circuit that is configured to translate a first input address in a first input address range to a first output address using a first translation rule, and
  a second address translator circuit that is configured to translate a second input address in a second input address range to a second output address using a second translation rule,
  wherein the apparatus is configured to translate the memory address to the first output address as the access address if the memory address is in the first input address range or translate the memory address to the second output address as the access address if the memory address is in the second input address range,
  wherein the first address translator circuit has a first priority level, wherein the second address translator circuit has a second priority level that differs from the first priority level, and wherein, if the memory address is in the first input address range as well as in the second input address range, the first address translator and the second address translator respectively output the first output address and the second output address, and the apparatus is configured to select either the first output address or the second output address based on the address translator circuit that has the highest priority as the access address.

6. The apparatus of claim 5,
wherein the first address translator circuit that has the first priority level is predetermined, and/or
wherein the second address translator circuit that has the second priority level is predetermined.

7. The apparatus of claim 5,
wherein the apparatus is configured such that, for a selected first input address, the first output address is equal to the selected access address, and/or such that, for a selected second input address, the second output address is equal to the selected access address.

8. The apparatus of claim 5,
wherein the apparatus is configured to have the first address translator circuit translate the memory address to a translated address, and
wherein the apparatus is configured to have the second address translator circuit translate the translated address to the access address.

9. The apparatus of claim 5,
wherein the first address translator circuit and/or the second address translator circuit are provided as logic circuitry.

10. The apparatus of claim 5,
wherein the first address translator circuit is configured to translate the first input address to the first output address within a first output address range,
wherein the second address translator circuit is configured to translate the second input address to the second output address within a second output address range, and
wherein the second output address range differs from the first output address range by at least one address.

11. The apparatus of claim 10,
wherein the memory includes a first extension memory segment associated with the first output address range and a second extension memory segment associated with the second output address range.

12. The apparatus of claim 11,
wherein the first memory extension segment is provided as a volatile memory, and
wherein the second extension memory segment is provided as a non-volatile memory.

13. The apparatus of claim 11, further comprising:
an operational memory segment,
wherein the operational memory segment is directly addressable by the memory address.

14. The apparatus of claim 13,
wherein the apparatus is configured to selectively operate
in an operational mode, wherein the access address is to an operational address range that is associated with the operational memory segment, and
in a setting mode, wherein the access address is to one of the first output address range and the second output address range.

15. An apparatus for an access to a memory, based on a memory address, at an access address, the apparatus comprising:
a first address translator circuit that is configured to translate a first input address to a first output address using a first translation rule, and
a second address translator circuit that is configured to translate a second input address to a second output address using a second address translation rule,
wherein the first output address is used as the second input address,
wherein the first input address is the memory address, and
an arbiter that is configured to receive the memory address, the first output address, and the second output address and to subsequently select, based on a detection of a priority signal, the memory address, the first output address, or the second output address as the access address for accessing the memory.

16. The apparatus of claim 15,
wherein the first address translator circuit has a first output priority signal that indicates the first address translator circuit has translated the first input address to the first output address,
wherein the second address translator circuit has a second output priority signal that indicates the second address translator circuit has translated the second input address to the second output address, and
wherein the second output priority signal is different than the first output priority signal.

17. The apparatus of claim 16, wherein if the first output priority signal or the second output priority signal are not detected, the apparatus is configured to select the access address as the memory address.

* * * * *